Feb. 25, 1958  C. GRUNSKY  2,824,577
PIPE PLUG
Filed June 27, 1955
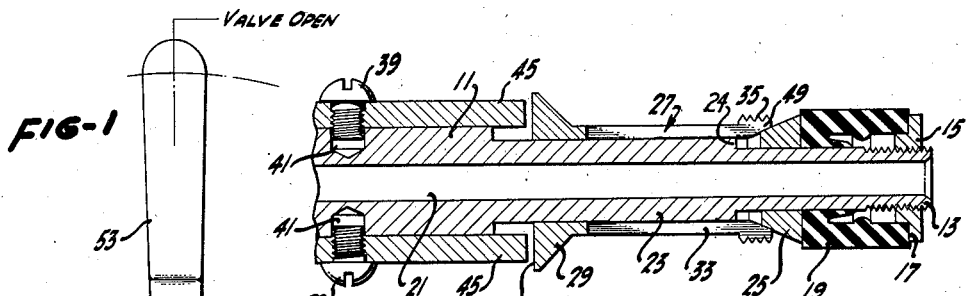
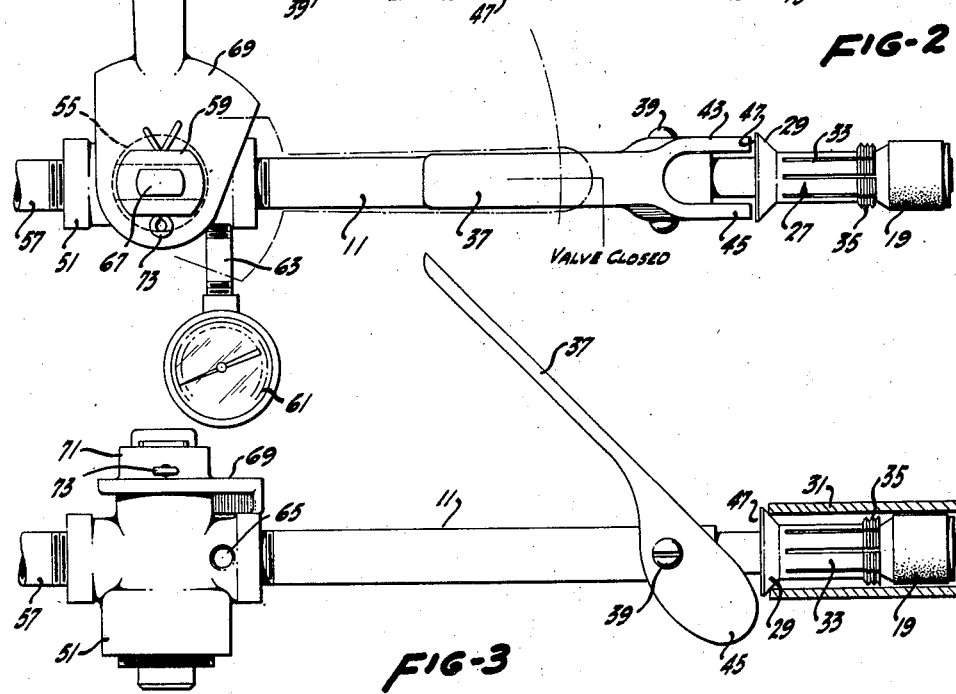
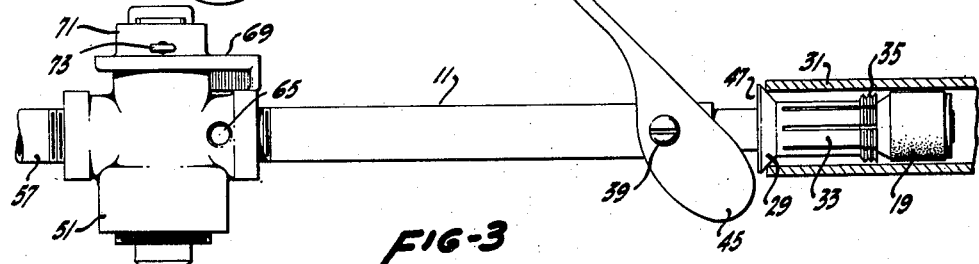
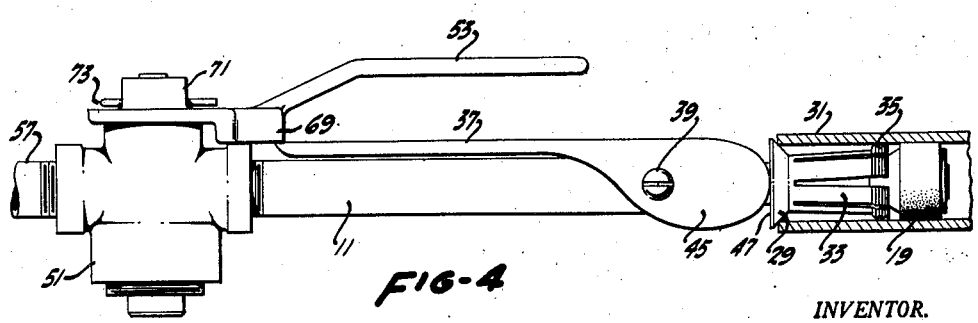
INVENTOR.
CHARLES GRUNSKY
BY
ATTORNEYS

United States Patent Office 2,824,577
Patented Feb. 25, 1958

2,824,577

PIPE PLUG

Charles Grunsky, San Francisco, Calif.

Application June 27, 1955, Serial No. 518,037

11 Claims. (Cl. 138—90)

This invention relates to pipe plugs particularly adapted for testing pressures within pipes and conduits.

The invention as herein constituted provides an expanding form of pipe gripper component which is adapted for positioning internally of the end of a pipeline to be tested. An expansible pipe gripper is supported toward one end of a tubular support spindle and is slidably mounted thereon, in a suitable fashion, such that the jaws or dogs which will serve to grip the interior of the pipe securely are expanded concurrently with radial expansion of a resilient gasket serving to seal pressure-wise the plugged pipe when gripped. As it is constituted, the invention provides a suitable valve mechanism at one end of the tubular support spindle, which valve mechanism opens or closes the interior of the tubular support spindle from the atmosphere or other type of connecting unit. The invention provides a valve opening and closing mechanism, which serves in the positioning of the valve closure to lock the expansible gripper in an expanded position at times when the gripper expansion operation precedes valve closure.

In one of its preferred forms, expansion of the gripper element is provided by means of a cam and lever combination secured to the tubular support spindle and arranged to provide relative slidable movement between the pipe-gripping component and the tubular shaft, and to force the end of the tubular shaft closer toward the pipe gripper concurrently with expansion of the gripper. At the same time a suitable gasket is compressed longitudinally of the shaft, while expanded radially of the shaft to press against the interior wall of the pipe to provide the pressure-tight seal.

A pipe plug of the character provided by this invention, accordingly, insures an interlocked relationship between the valve-operating mechanism and the pipe plug, to prevent release of the plug from the end of the pipeline to be tested during periods of valve closure, at which time the plugged pipeline may be under considerable pressure. The mechanism provided by this invention also insures a rapid closing or plugging of the end of a pipeline, together with the opportunity for quick removal without necessitating any welding or cutting of the pipeline, thereby saving considerable time, labor and expense in establishing tests. Provision is made by the invention for the attachment of a suitable pressure-indicating device into communicating relationship with the interior of the tubular support spindle, and thus of the pipeline plugged, and to be tested.

In accordance with the foregoing general statement of the nature of the invention, it will now become apparent that among the objects of the invention are those of providing an expansible pipe gripper serving to expand and lock interiorly of a pipeline to be tested, and at the same time tightly to plug and seal the end of the pipeline for the purpose of making test meaturements.

A further object of the invention is to provide a pipe gripper and plug which cannot readily be removed while the pipeline is under pressure.

A further object of the invention is that of providing a pipe plug and pressure-tight testing component which may be rapidly inserted and removed from the pipeline, to which an appropriate measuring indicator may readily be attached, and which includes a minimum number of parts and components, and is not subject to operating trouble. Consequently, among the objects of this invention are naturally those of providing an efficient device at minimum cost and at the same time a device generally free from mechanical defects, and usable with varying size pipelines.

Other objects and advantages will become apparent from the consideration of the following description and claims, read in connection with the accompanying drawings, in which:

Fig. 1 is a plan view of the plug and valve mechanism with the plug in its released or compressed position and the valve open;

Fig. 2 is a sectional view looking down on Fig. 1 toward the plane of the drawing sheet and including the right-hand part of Fig. 1 to show the relationship of the slidable gripper and expansible gasket, together with the gripper-operating mechanism;

Fig. 3 is a view generally similar to that of Fig. 1, taken in a direction at right angles to that of Fig. 1, to show the device in elevation and positioned within a pipe but with the gripper loose; and Fig. 4 is a view similar to Fig. 3, with the plug inserted within the end of a pipeline to be tested, the gripper device expanded, the valve mechanism closed and the plug control mechanism locked by the valve-operating mechanism.

Now referring to the drawings for a further understanding of the invention, the plug comprises, generally speaking, a tubular support spindle 11, to the threaded end 13 of which there is attached an end member 15 having a shoulder 17 against which a resilient gasket 19 is adapted to rest. The tubular portion of the support spindle is indicated on the drawings (see particularly Fig. 2) by the opening 21 extending longitudinally thereof. As can be seen also from Fig. 2, the tubular spindle increases in its outer diameter in the region 23, and forms a shoulder 24 slightly to the left of the position at which the resilient gasket is placed thereabout. Surrounding and supported for slidable movement upon the support spindle portion which is of smallest outer diameter, there is a frusto-conical gripper expanding wedge 25, against the flattened base of which the resilient gasket 19 is rested. Extending along the threaded spindle and in the region of its larger diameter 23, there is an expansible gripper element 27, which terminates at one end in an outwardly extending shoulder 29, which is also generally of conical shape, and which is shown particularly by Figs. 3 and 4 as adapted to abut the end of a pipe 31, in which the plug is adapted to be fitted.

The arms 33 of the expansible gripper element 27 extend outwardly from the shoulder 29 and along the tubular support spindle. Each arm terminates in a gripper tooth or dog section 35, arranged when expanded by virtue of penetration of the frusto-conical wedge interiorly thereof and along the spindle 11 to move radially outwardly and to grip the interior wall of a pipe, such as shown particularly by Fig. 4. The individual arms of the gripper, as can be seen plainly from the drawings, is formed by longitudinally slotting, at arcuately spaced positions, the gripping member with the slots extending inwardly toward the shoulder 29. Outward expansion of the arms 33 of the expansible gripper element 27 is provided under the control of an operating lever 37, which is pivoted upon the tubular spindle by the mounting supports, conventionally represented as the support screws 39, which are threaded through the lever and extend into interiorly tapped portions 41 of an enlarged section of the tubular spindle 11 (see particularly the sectional showing of Fig. 2).

The gripper-control lever, as shown particularly by Fig. 1, terminates in a bifurcated end 43, of which each end comprises a cam surface 45 adapted, with closure or movement of the lever 37 toward a position parallel to the tubular support spindle 11, to press upon and against the flattened surface 47, into which the outwardly extending shoulder 29 of the expansible gripper element 27 terminates. Pressure exerted upon the flattened surface 47 tends to move the expansible gripper element 27 toward the end member 13.

It, accordingly, can be observed that with a fixed separation existing between the end member 15, secured to the threaded end of the spindle 11, and the pivoting point 39 of the support screws attached to the tubular support spindle, any movement of the operating lever 37 to a position substantially parallel to the tubular support spindle will cause the expansible gripper element 27 to be forced in the direction toward the end member 15. Motion of the expansible gripper in such direction then causes the gripper arms 33 to tend to slide into contact with the frusto-conical wedge 25. With this condition occurring, further movement of the cam surface 45 toward a position corresponding to that attained with the lever handle 37 moved adjacent to the tubular support spindle compresses the resilient gasket 19 longitudinally of the spindle and against the end member 15, but simultaneously expands this resilient gasket radially, as can be appreciated particularly from the showing of Fig. 4.

At the same time, the flattened base of the frusto-conical wedge 25 resting against the resilient gasket 19 and limited in its longitudinal motion along the tubular support spindle, thereby tends to spread the arms 33 of the expansible gripper element 27 until the arms and the gripping teeth or dogs thereon move generally radially outwardly to grip a pipe within which the unit may be assembled, as shown particularly by Fig. 4, it being noted, of course, that in Fig. 3 the unit has been positioned within the pipe so that the shoulder 29 abuts the end of the pipe, while in Fig. 4 while the shoulder 29 still is held against the end of the pipe, and with the cam 45 brought to its position to draw the frusto-conical wedge 25 interiorly of the gripper arms 33, the pipe 31 is securely gripped on its inner wall. At the same time, the expansion radially of the resilient gasket 19 seals the pipe from the escape of pressure around the gripping teeth or dogs and any pressure or fluid contained within the pipe can only pass, under these conditions, interiorly of the tubular spindle 11 and through the tubular opening 21.

At the end of the tubular support element 11 opposite that adapted for positioning internally of the pipe 31, there is secured a plug valve 51 having secured thereto an opening and closing lever 53. As conventionally shown by Fig. 1, the valve 51 is interiorly formed with a cylindrical opening 55 extending therethrough and into one wall of which opening the tubular support spindle is adapted to connect. As conventionally illustrated, a suitable outlet connection 57 is provided at the opposite side of the valve from that into which the tubular support spindle is attached. Movement of the valve opening and closing lever 53 is adapted to turn the valve mechanism 59 in a way such that the position may be changed until the valve mechanism is at right angles or 90 degrees from that shown by Fig. 1. In this event there is a closure established by the valve mechanism 59 between the outlet connection 57 and the tubular opening 21 within the tubular support spindle 11. Any pressure built up within the pipeline 31 to which the plug unit may be attached is then capable of manifesting itself and being registered on a suitable pressure indicator, such as the conventionally shown gauge 61. The gauge 61 may be attached in any suitable manner, such as by the connector 63, to the connection point 65 on the valve 51.

The valve mechanism 59 preferably terminates at its upper end in a flattened portion 67 to provide for ready turning by means of a suitable handle. The operating handle or lever 53 terminates in a generally sector-shaped plate 69 having a raised portion 71 centrally located thereon and adapted to fit over the flattened end 67 of the valve mechanism proper. The opening and closing lever 53 and its therewith associated sector-shaped plate 69 may be secured to the flattened valve mechanism control 67 in any desired fashion, although, illustratively, the cotter pin 73 has been shown.

It will be observed particularly from the showing of Fig. 4 that if the operating lever 37 for the expansible gripper element 27 is moved to a position such that it is substantially parallel and adjacent to the tubular element 11, the sector-shaped plate 69 will rest over the lever 37 when the valve mechanism 59 is moved by the lever 53 to a position such as to close the valve (that is, in a position 90° from that shown by Fig. 1). Under the circumstances by the overlap of the sector-shaped plate 69 occurring when the opening and closing lever 53 is also moved to a position substantially parallel to the tubular support spindle 11, the expansible plug and resilient gasket are each forced tightly within the interior of the pipe to be plugged and the connection cannot be removed in the absence of first opening the valve to disengage the sector-shaped plate from the outer end of the lever 37. This provides an interlock and a safety valve handle which prevents the release of the plug from the interior of the pipe until the valve is first opened. This interlock control thus prevents removal of the plug while the pipeline is under pressure and introduces a significant safety factor into the operation.

When it is desired to remove the plug from the pipeline the pressure may be released by moving the lever 53 gradually to the position shown by Fig. 1, for instance. At this time the sector-shaped plate 69 will move through an arcuate distance sufficient to clear the outer tip of the operating lever 37 so that the lever may then be turned in a clock-wise direction (looking at Figs. 3 and 4) to assume a position such as that shown by Fig. 3. Under these conditions the pressure of the cam surface 45 against flattened surface 47 is removed (as shown by Fig. 3) and the resiliency of the gasket 19 is such as to cause it to contract in the radial direction, but expand in a direction longitudinally of the spindle and thus tend to move the spindle slightly inwardly of the pipe, which motion can be accentuated by a slight manual effort applied on the lever, and at this time the shoulder 24 of the enlarged section 23 of the spindle contacts the upper flattened surface of the conical wedge 25 so as to loosen it from tight engagement interiorly of the arms 33 of the expansible gripper element 27. The springiness and the resiliency of the arms 33 then tend to cause the resilient gripper member 27 and the gripping teeth or dogs 35 to be released from the inner surface of the pipe, after which the complete unit may be readily withdrawn.

Various other safety factors for insuring the maintenance of the plug within the pipeline and other equivalent plug expanding features of course naturally follow what is herein described.

Having now described the invention, what is claimed is:

1. In a pipe plug, a support spindle adapted for positioning internally of a pipe, a pipe gripper surrounding the spindle and slidable thereon, said gripper having a shoulder at one end and comprising a plurality of circumferentially spaced arms extending outwardly from the shoulder portion and terminating in pipe-gripping ridges at the end opposite the shoulder, a frusto-conical wedge also surrounding the spindle and slidable thereon, the wedge having its apex turned toward the pipe-gripping end of each outwardly extending cantilever arm, an end member secured to the spindle and having means to limit longitudinal motion of the gripper and wedge, and means for longitudinally sliding the gripper member and the frusto-conical wedge along the spindle toward the end member so that pressure exerted from the end member on the wedge base forces the conical surface of the frusto-conical wedge interiorly of the cantilever gripper arms and between the gripper arms and the spindle to force the pipe-gripping ridge generally radially outwardly from the spindle.

2. In a pipe plug, a spindle, a generally radially expansible gripper having a shoulder at one end and a plurality of cantilever arms extending outwardly from the region of the shoulder with each arm terminating in pipe-gripping ridges at the free end, a frusto-conical wedge having its apex turned toward the pipe-gripping end of the gripper, each of the grippers and the wedge being slidably supported on the spindle, a flexible gasket also surrounding the spindle and adjacent to the base of the frusto-conical wedge, an end member secured to one end of the spindle and having a shoulder in generally abutting relationship to the gasket, and means for longitudinally sliding the expansible member and the frusto-conical wedge along the spindle toward the end member so that the wedge base presses the gasket against the end member to compress the gasket longitudinally of the spindle and to expand it radially thereof and concurrently forces the conical surface of the frusto-conical wedge interiorly of the cantilever arms to spread the arms to force the gripping ridges outwardly from the spindle.

3. In a pipe plug, a tubular support spindle adapted for positioning internally of a pipe, a radially expansible pipe-gripper having a shoulder at one end and a plurality of circumferentially spaced cantilever arms extending outwardly from the region of the shoulder and each terminating in pipe-gripping ridges at the end opposite the shoulder, a frusto-conical wedge having its apex turned toward the pipe-gripping end of the gripper, each of the grippers and the wedge being supported on the spindle and surrounding it to be slidably supported thereon, a flexible gasket also surrounding the spindle and adjacent to the base of the frusto-conical wedge, and an end member secured to the spindle, said end member having a shoulder in generally abutting relationship to the gasket, and means for longitudinally sliding the expansible member and the frusto-conical wedge along the spindle toward the end member so that the wedge base presses the gasket against the end member to compress the gasket longitudinally of the spindle and to expand it radially thereof and concurrently force the conical surface of the frusto-conical wedge interiorly of the gripper and between the gripper and the spindle to force the cantilever arm outwardly so that the pipe-gripping end of each arm moves radially outwardly from the spindle to engage the internal wall of the pipe within which the gripper is adapted to be positioned.

4. The combination claimed in claim 3 comprising, in addition, a connector element for connecting pressure-indicating means to the end of the tubular support spindle remote from the end member to indicate pressure internally of the shaft at time periods when the gripping teeth are expanded to grip a tubular element surrounding the shaft and the flexible gasket is expanded for a pressure-tight fit.

5. The apparatus claimed in claim 4 wherein the means slidably to move the expansible gripper and the frusto-conical cantilever arm spreader longitudinally of the shaft comprises a pivoted lever secured to the shaft and a cam secured at one end of the lever and a handle formed at the opposite end thereof, said lever being adapted to be positioned substantially parallel and adjacent to the shaft with expansion of the gripping member.

6. The combination claimed in claim 5 comprising, in addition, a valve connected at the end of the hollow shaft remote from the adjusting nut, a valve-operating handle adapted to move the valve between an open and a closed position and in the closed position permit pressure from within the tubular shaft to be indicated on an indicator connected thereto, and means on the valve-operating shaft to lock the gripper expanding lever in a position to maintain a gripping relationship within a pipe during valve closure periods when such expansion precedes valve closure in operating sequence.

7. A plug for pipelines to be pressure tested which comprises a hollow shaft member, an adjusting nut having an outwardly extending shoulder secured at one end of the shaft, a pipe gripper element loosely mounted upon and surrounding the shaft and having at one end a shoulder section adapted to abut one end of a pipe in which the gripper is internally positioned and a plurality of circumferentially spaced cantilever arms extending outwardly from the region of the shoulder and terminating in pipe-gripping teeth at the free end so as to be generally radially expansible, a frusto-conical spreader for the cantilever arms and the therewith associated gripping teeth also surrounding and loosely mounted on the shaft and having its apex turned toward the gripper and its base substantially parallel to the shoulder of the adjusting nut, a flexible gasket surrounding the shaft and supported between the adjusting nut and the spreader base, the inner surface of the toothed end of each cantilever arm of the pipe-grinding element having a shape generally complementing that of the frusto-conical spreader, means for sliding the gripper elements longitudinally of the spindle in the direction of the adjusting nut whereby the cantilever arms are forced generally radially expanded by slidable engagement with the conical wall of the spreader to move the gripper teeth outwardly from the shaft and the flexible gasket is longitudinally compressed along the shaft and expanded radially of the shaft so that a tubular element surrounding that end of the shaft, including the gasket and the gripping teeth and which is caused to abut the shoulder of the gripper is gripped internally by the gripping teeth and a pressure-tight fit is established by the expansible gasket.

8. The apparatus claimed in claim 7 wherein the means slidably to move the expansible gripper and the frusto-conical spreader longitudinally of the shaft comprises a bifurcated pivoted lever secured to the shaft, a cam element terminating each bifurcated end and located at opposite sides of the shaft and a handle at the opposite end of the lever, said lever being adapted to be pivoted to a position substantially normal to the shaft with a release of pressure upon the slidable elements and to be positioned substantially parallel and adjacent to the shaft with an application of pressure on the slidable elements to expand the gripping members.

9. The combination claimed in claim 8 comprising, in addition, a valve connected at the end of the hollow shaft remote from the adjusting nut, a valve-operating handle adapted to move the valve between its open and closed positions and in the closed position permit pressure from within the tubular shaft to be indicated on an indicator connected thereto, and means on the valve-operating shaft to lock the gripper expanding lever in a position to maintain a gripping relationship within a pipe during valve closure periods when gripper expansion precedes valve closure in operating sequence.

10. In a device for testing internal pressure within pipelines and the like, a tubular spindle having one end adapted for positioning internally of the pipeline, a valve at the opposite end of the spindle to open and close the passage within the tubular portion thereof, a gripping device and a resilient gasket connected at the end of the spindle adapted to fit internally of the pipeline, a cam and lever means secured to the spindle for radially expanding each of the gripping device and the resilient gasket in one lever position and for permitting retraction of the gripping device and resilient gasket in a second lever position, means for opening and closing the valve including means to lock the lever in a position to hold the gripping device and the resilient gasket in expanded position when initial expansion precedes valve closure, and means for connecting a pressure indicating device to indicate the pressure within the tubular spindle.

11. A testing device for pipelines comprising an expanding pipe-gripping element adapted to fit internally of the pipeline to be tested, a tubular holder having the pipe gripper secured at one end thereof, a valve connected to the other end of the tubular holder for opening and closing the passage therein, means secured to the tubular holder for expanding the gripping device in one operating position and for permitting a retraction of the gripping device in a second operating position, a gripper locking means connected with the valve opening and closing control to prevent retraction of the pipe-gripping device during periods of valve closure in which gripper expansion preceded valve closure and means to connect the interior of the tubular member to a measuring device.

References Cited in the file of this patent

UNITED STATES PATENTS

| | | |
|---|---|---|
| 1,909,251 | Carraher | May 16, 1933 |
| 1,927,448 | Terry | Sept. 19, 1933 |
| 2,011,824 | Pearson | Aug. 20, 1935 |
| 2,375,995 | Kaeser | May 15, 1945 |
| 2,475,748 | Le Roy | July 12, 1949 |
| 2,607,370 | Anderson | Aug. 19, 1952 |